United States Patent
Zavodny et al.

(10) Patent No.: US 7,994,459 B2
(45) Date of Patent: Aug. 9, 2011

(54) CAMERA-BASED HELIOSTAT CALIBRATION WITH ARTIFICIAL LIGHT SOURCES

(75) Inventors: Maximilian Zavodny, Pasadena, CA (US); Dan S. Reznik, New York, NY (US); Michael James Forte, Pasaden, CA (US)

(73) Assignee: Esolar, Inc., Burbank, CA (US)

( * ) Notice: Subject to any disclaimer, the term of this patent is extended or adjusted under 35 U.S.C. 154(b) by 147 days.

(21) Appl. No.: 12/562,990

(22) Filed: Sep. 18, 2009

(65) Prior Publication Data

US 2010/0031952 A1    Feb. 11, 2010

Related U.S. Application Data

(63) Continuation-in-part of application No. PCT/US2009/053046, filed on Aug. 6, 2009.

(60) Provisional application No. 61/137,917, filed on Aug. 6, 2008.

(51) Int. Cl.
    *F24J 2/38* (2006.01)

(52) U.S. Cl. .................................. 250/203.4; 126/573

(58) Field of Classification Search .... 250/203.1–203.4, 250/205, 208.1, 559.07, 559.08; 126/573–578, 126/600–606
See application file for complete search history.

(56) References Cited

U.S. PATENT DOCUMENTS

| | | | |
|---|---|---|---|
| 4,564,275 A | 1/1986 | Stone | |
| 5,862,799 A | 1/1999 | Yogev et al. | |
| 6,926,440 B2 * | 8/2005 | Litwin | 374/124 |
| 7,906,750 B2 * | 3/2011 | Hickerson et al. | 250/203.4 |
| 2004/0086021 A1 * | 5/2004 | Litwin | 374/120 |
| 2008/0236568 A1 * | 10/2008 | Hickerson et al. | 126/578 |
| 2009/0107485 A1 * | 4/2009 | Reznik et al. | 126/600 |
| 2010/0191378 A1 * | 7/2010 | Gilon et al. | 700/275 |
| 2011/0000478 A1 * | 1/2011 | Reznik | 126/574 |

FOREIGN PATENT DOCUMENTS

JP    55-153903 A    12/1980

OTHER PUBLICATIONS

International Search Report for PCT/US09/053046 dated Mar. 12, 2010.

* cited by examiner

*Primary Examiner* — Seung C Sohn
(74) *Attorney, Agent, or Firm* — Michael Blaine Brooks, PC; Michael B. Brooks

(57) ABSTRACT

Systems and methods of calibrating heliostat parameters for subsequent open-loop sun-tracking, the calibration based on driving artificial light source reflections from one or more heliostats into one or more image sensors.

29 Claims, 11 Drawing Sheets

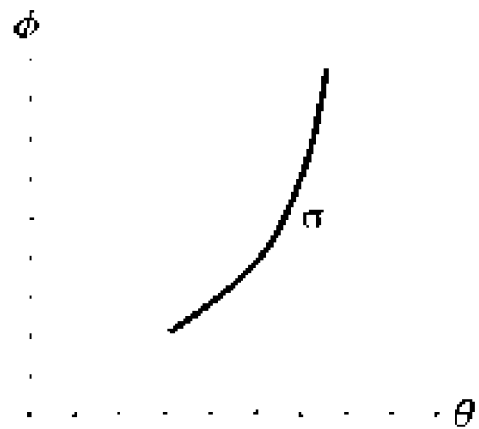 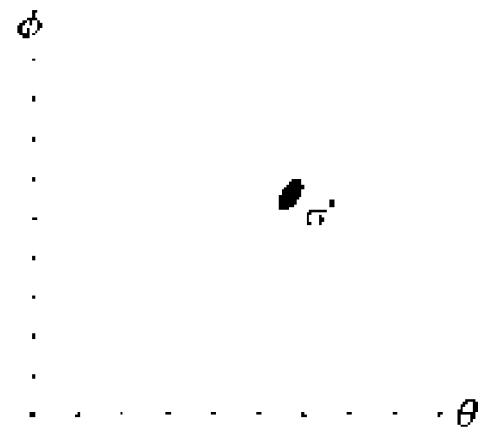
FIG. 8A            FIG. 8B
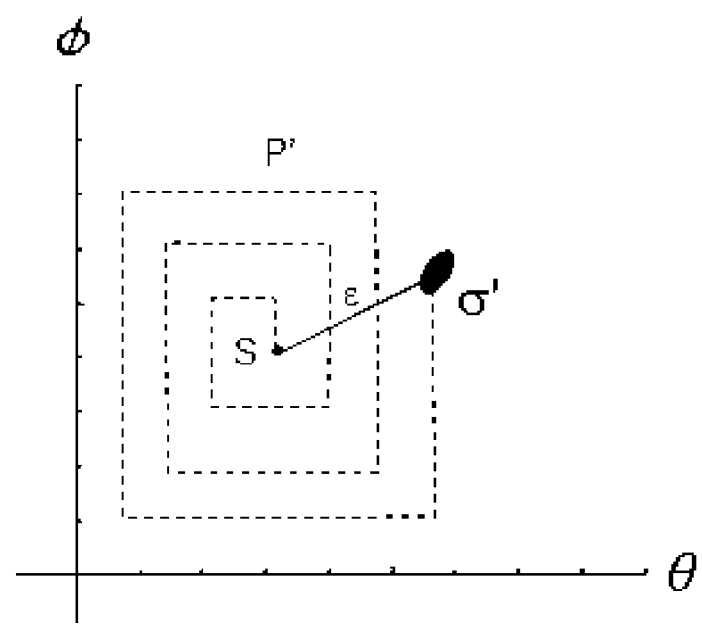
FIG. 9

CAMERA-BASED HELIOSTAT CALIBRATION WITH ARTIFICIAL LIGHT SOURCES

This application is a continuation-in-part of International Application No. PCT/US09/53046 filed Aug. 6, 2009, which claims the priority and benefit of U.S. Provisional Patent Application Ser. No. 61/137,917, filed Aug. 6, 2008, which are hereby incorporated herein by reference in their entirety for all purposes.

TECHNICAL FIELD

The present invention relates generally to heliostat tracking calibration in a solar power plant, and more particularly to heliostat tracking calibration based on artificial light sources.

BACKGROUND OF THE INVENTION

Heliostat calibration refers to estimating a set of parameters, e.g., mounting position and angular pose, which are necessary for issuing tracking efficient commands to a heliostat in a central receiver plant. U.S. Pat. No. 4,564,275, issued Jan. 14, 1986 to K. Stone describes a calibration method and system whereby heliostats are commanded to reflect the sun to a calibrating target screen located below the actual receiver aperture. Based in part on an expected time-dependent position of the sun in the sky, an error signal may be defined as the difference between the expected reflected image centroid and the actual centroid of the reflected image on the target, as detected by a ground-mounted camera system. The superposition of reflections from multiple heliostats onto the target screen limits or prevents the calibration of multiple mirrors concurrently: that is, only one or very few heliostats can be calibrated at a time. The error signals are measured for several Sun positions over the course of several days, after which the heliostat pose or set of tracking parameters that best fits the data is estimated by an optimization process.

The sun is used as the directional light source. This implies reflection by a heliostat is only detected following a two-dimensional angular search around a starting position, e.g., computed by inverse kinematics using nominal geometric parameters. The set of heliostat configurations, e.g., in an ordered rotational pair of angles azimuth-elevation (az-el) or an unordered rotational pair of angles (tilt-tilt) space, which produce detectable reflections is relatively small (<10 mrad diameter, corresponding to the angular size of the sun), which greatly delays the calibration process when poor nominal estimates of heliostat parameters are available. Furthermore, these systems depend on the sun being present for clear day calibration only, ruling out calibration at cloudy days or nighttime.

SUMMARY

System and method embodiments of the present invention provide for the calibrating of heliostat parameters for subsequent open-loop sun-tracking, the calibration based on driving artificial light reflections from one or more heliostats into one or more image sensors.

The present invention employs one or more artificial light sources along with a specialized search and parameter estimation procedure. Embodiments of the present invention comprise one or more of the following features:

a) calibration may be executed at any time, referencing one or more artificial light sources, e.g. curvilinear lineal light sources, or point-like light sources, preferably at night, irrespective of weather b) image sensors may not require sun-filtering or heat-shielding (parallelism becomes limited by the resolution of the sensor and blob size)

c) Owing to the curvilinear geometry of light sources, the region in heliostat configuration space at which a reflection is detected is much wider, greatly reducing the search time expected for detection.

The invention in its several embodiments comprises a system and method for heliostat calibration. Exemplary system embodiments may comprise: one or more artificial light sources, such as curvilinear light sources that may comprise lineal light sources, and/or one or more point light sources; set of image sensors such as one or more cameras; a set of heliostats that may be re-oriented via one more axes of control motion; a target such as a tower receiver, and a computing platform comprising computer-executable instructions and/or circuitry that, in cooperation with heliostat actuators, effects the motions of heliostats during calibration and sun-tracking. The system may further comprise a surveying data store comprising positional information for each image sensor, e.g. the position of the center of their respective apertures with sufficient accuracy to support further refinement via calibration, the geometry and location of each applicable light source, the target location, and nominal (pre-calibration) and optimized (post-calibration) descriptions of heliostat locations and internal parameters required for tracking.

Some system embodiments have a controller module configured to command one or more heliostats to search for configurations that produce a reflection of a light source of choice in such a way that it is detectable by a camera of choice, and issuing a record to a sample data store comprising information related to the configuration, e.g., the angular orientation, at which one or more such reflections were produced, as well as the time at which such an event was detected, the sun position, and the heliostat unique identifier. Some system embodiments of the present invention may further comprise a sample data store that stores detected reflection information as produced by the controller. Some system embodiments of the present invention may further comprise a module configured to estimate for one or more heliostats, using an optimization procedure, a set of heliostat geometric or kinematic parameters which best fits or explains the set of samples gathered for that heliostat by the said controller. The controller may be configured to generate heliostat re-orientation commands to direct reflections for calibration and the reflection may be arrived at in one or all of the following methods: (a) generating an inverse kinematic estimation of a starting position; (b) generating a spiral or piecewise linear motion of the heliostat in its configuration space; and/or (c) a centering procedure after an initial reflection is detected which estimates the centroid of a contiguous region of detectable reflections.

Some system embodiments may comprise one or more light sources that are substantially vertical, with known heights for lower and upper endpoints, and in some embodiments, these vertical light sources may further comprise one or more point-sources which are separately mounted or which are mounted within their spans (termed "internal"), with a feature which is separately detectable, such as a color contrast or flashing. Accordingly, methods of separate detection of reflection of the present invention may be based on a colored main light source stem and differently colored internal point-sources. Also, methods of separate detection may be based on a main light source stem being of a single, constant brightness, and the internal point-sources having a flashing pattern, or vice-versa. Some system embodiments of the present invention may comprise one or more curvilinear light sources, that may comprise lineal light sources, and the curvilinear light sources may be oriented substantially horizontal, at an angle with the horizontal, or non-straight. Some system embodiments of the present invention comprise one or more vertical curvilinear light sources having one or more perpendicular curvilinear light sources that intersect at various positions along the vertical curvilinear light source. The imaging sensors of some system embodiments of the present invention comprise cameras with an aperture which is a pinhole, a lens system, or a wide-angle lens system and the imaging sensors may contain attenuating filtering. To maximize contrast and/or minimize noise, artificial light based calibrations may be conducted after nightfall and before sunrise, or during an eclipse of the sun.

For example, some system embodiments of the present invention include a sun-tracking system for a central receiver solar power plant, comprising: (a) a heliostat field comprising heliostats for reflecting sunlight to a receiver; (b) a plurality of artificial light sources that may include flashing lights and may include one or more flashing lights comprising at least one low-duty cycle, high intensity, flashing light; (c) one or more cameras directed toward at least a subset of the heliostats and configured for producing images of the heliostats where a camera may be configured with a shutter or gain control permitting synchronized receptions of artificial light, particularly high intensity light flashing at a low duty cycle during daylight or moonlight; and (d) a controller configured for processing the images, controlling the heliostats, and configured for estimating parameters of the heliostats for open-loop sun-tracking based on artificial light source reflections that may include flashing light source reflections and may include low-duty cycle, high intensity light source reflections, from one or more heliostats, received by the one or more cameras that may be received. The system controller and camera may be configured for operation during at least one of: daylight and moonlight. For example, where the plurality of artificial light sources comprises one or more flashing lights, then at least one of the one or more cameras directed toward at least a subset of the heliostats may be further configured for synchronized image detection of the one or more flashing lights, and the controller may be further configured for estimating parameters of the heliostats for open-loop sun-tracking based on flashing artificial light source reflections from one or more heliostats, received by the one or more cameras.

Method embodiments of the present invention include detecting one or more artificial light reflections such as curvilinear light source reflections, and that may be detected by an imaging sensor as a substantially contiguous group of discrete pixels or "blob," in binary, or multi-bit format. Method embodiments of the present invention provide for more than 50 heliostat reflections processed simultaneously and independently at one or more two-dimensional imagers such as cameras. A reflection search and centering procedure of some method embodiments of the present invention may be based on a priori, e.g., survey-derived, engineering drawing derived, or otherwise known, geometry of the locus of detectable reflections in the heliostats configuration space, and the configuration space search process may comprise driving a heliostat in a single degree of freedom toward the locus, or in one or more alternate single-degree of freedom motions, or all degrees of freedom simultaneously. Some reflection search and centering procedure embodiments explore one or more features of a single light source, such as detecting internal point-sources, detecting endpoints, detecting changes in segmented features; and the parameter estimation is achieved via the minimization of errors with respect to the expected geometry. Some method embodiments apply standard Non-Linear Least-Squares optimizer to estimate best-fit calibrated parameters. Some method embodiments of the present invention may collect sufficient samples to overly constrain the solution set, and thereby defining more constraints than there are parameters to be estimated, leading to robustness of results with respect to noise in individual samples. Some method embodiments of the present invention may comprise driving heliostats, having estimated, i.e., calibrated, parameters, in open-loop during sun-tracking based on a sun-positioning algorithm. Some method embodiments of the invention have a small set of tracking heliostats replaced in the list of calibrating heliostats so as to refresh their internal parameters and/or update them with respect to geometric shifts over time.

Some method embodiments of the present invention apply a criterion based on angular distance and/or linear independence to schedule reflection searching by a heliostat with a camera pair, a curvilinear light source, and one or more criteria based on expected path length may be used to schedule reflection searches into a camera from a set of two or more light sources.

Some method embodiments of the present invention may be used entirely independently or in conjunction with a sun-based light-source method described in the prior art, namely, simultaneously during a clear day, or before dawn or after dusk, in alternate fashion with a daytime method. For example, some method embodiments of the present invention may be based on at least one camera receiving heliostat reflections of artificial light sources and configured for acquiring heliostat pointing samples in at least one of: daylight and moonlight, and the estimating by the computing device may further comprise estimating heliostat tracking parameters of the heliostats for open-loop sun-tracking based on artificial light source reflections from one or more heliostats, received by the at least one camera in at least one of: daylight and moonlight. The plurality of artificial light sources may comprise one or more flashing lights whereat least one camera is directed toward at least a subset of the heliostats may be further configured for synchronized image detection of the one or more flashing lights, and the estimating by the computing device may further comprises estimating parameters of the heliostats for open-loop sun-tracking based on flashing artificial light source reflections, from one or more heliostats, received by the at least one camera. Some method embodiments may include a flashing artificial light that flashes, at a low-duty cycle, a high intensity light source.

Some embodiments of the present invention include a controller comprising a processing unit and addressable member; where the processing unit configured to: (a) receive, by the controller, acquired heliostat pointing samples comprising reflected artificial light via a one or more cameras receiving heliostat reflections of one or more artificial light sources; and (b) estimate heliostat tracking parameters based on the pointing samples. In some embodiments the processor of the controller is further configured to (not necessarily in the following order):
(c) search for a configuration of a first heliostat of the heliostats that reflects light from an artificial light source toward a first camera of the cameras; and (d) store a sample comprising an identifier of the first heliostat, an identifier of the first camera, an indication of the artificial light source directionality, and the heliostat configuration.

Embodiments of the present invention include processor readable medium, e.g., installable to the processor from a non-volatile computer-readable medium, having processor executable instructions thereon, which when executed by a processor cause the processor to (not necessarily in the following order): (a) acquire, by a controller, heliostat pointing samples comprising reflected artificial light via one or more cameras receiving heliostat reflections of one or more artificial light sources; (b) estimate heliostat tracking parameters based on the pointing samples; (c) search for a configuration of a first heliostat of the heliostats that reflects light from an artificial light source toward a first camera of the cameras; and (d) store a sample comprising an identifier of the first heliostat, an identifier of the first camera, an indication of the artificial light source directionality, and the heliostat configuration.

BRIEF DESCRIPTION OF DRAWINGS

The present invention is illustrated by way of example and not limitation in the figures of the accompanying drawings, and in which:

FIG. 8A depicts an exemplary reflection region in configuration space corresponding to a curvilinear light source;

FIG. 8B depicts an exemplary region in configuration space corresponding to a point light source;

FIG. 9 depicts an exemplary spiral search in configuration space to locate a point source reflection region;

DETAILED DESCRIPTION

Rather than ground-mounted cameras and target screens, one or more cameras may be mounted atop poles and directed toward the heliostat field. A heliostat which reflects the sun toward a camera can be imaged, under suitable filtering, as a small compact region of the image sensor—a "blob"; non-contiguous heliostats can be imaged simultaneously at non-adjacent regions of the image sensor, and therefore significant parallelism is possible, and in practice it may be limited by the heat-rejection system protecting the camera and/or the proximity of far-away heliostats as they are imaged onto the image sensor. Accordingly, heliostat tracking parameters may be estimated after each heliostat's mirror is oriented so as to produce reflections into all cameras visible to it, e.g., in round robin fashion, and over several sun positions.

Heliostat calibration refers to estimating the geometric parameters necessary for a heliostat to reflect the sun continuously into a receiver according to open-loop control commands. Such estimation is typically required since such parameters are not known to a sufficient level of accuracy, following manufacturing and installation processes. For example, sufficient accuracy in the six rigid body parameters of a heliostat's mirror is required typically for a given concentration to be achieved at a target. Likewise parameters internal to a heliostat kinematics, e.g., as produced by a manufacturing process, might not be repeatable under commercially acceptable cost constraints. For example, and azimuth-elevation or tilt-tilt kinematic may prescribe that its axes of rotation be exactly perpendicular, when in fact, a certain perpendicularity tolerance (to be estimated) will be associated with each manufactured unit. Another toleranced manufacturing parameter may be the mounting pose of the mirror with respect to the mirror supporting structure, for example. Following a simple surveying process of few components of the system, the present invention allows for heliostats which are both manufactured and installed under relatively large tolerances, to track with enormous precision, following a calibration procedure. Via the use of artificial light sources, in either point or curvilinear geometries, calibration may be executed at any time, preferably at night, and irrespective of weather. Due to the "artificial" nature of light sources, image sensors require little or no sun-filtering or heat-shielding; parallelism, no longer limited by heat considerations, but by the resolution of the sensor, blob size, namely, the detectability of two contiguous heliostats—e.g., at a receding area of the field—as disjoint blobs on the image plane; and calibration execution times are greatly shortened.

Figure 1:
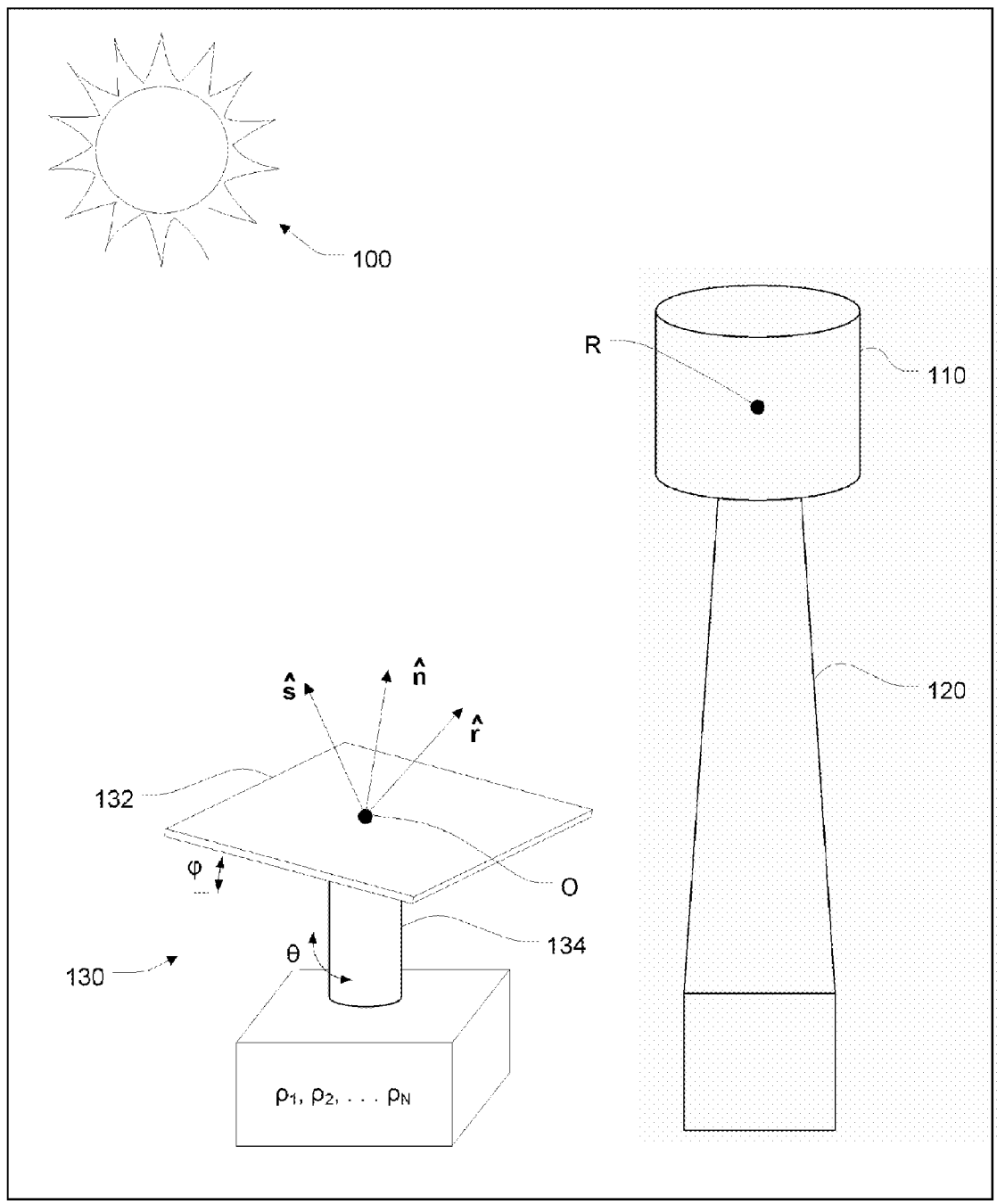
FIG. 1 is a schematic view of a heliostat reflecting sunlight to a receiver according to embodiments of the present invention.

FIG. 1 shows aspects of how a heliostat 130 is modeled according to the present invention. The heliostat 130 has a mirrored surface 132 that reflects light from the sun 100 to a receiver 110. The receiver 110 is generally mounted atop a tower 120. Sunlight incident on the receiver 110 is captured by the receiver 110 and transferred as heat to a heat transfer fluid, such as oil, steam, or molten salt, or converted directly to electricity by high-concentration photovoltaic cells. The heat transfer fluid may be used directly in some embodiments or later used in connection with a power block containing a turbine to generate electricity.

The mirrored surface 132 or mirror of the heliostat 130 is a rigid and substantially planar surface in the embodiment of FIG. 1. In other embodiments, other shapes may be used, for example, a curved or multi-faceted surface. Reflection of sunlight to the receiver 110 depends on the orientation of mirror 132. The geometry of reflected sunlight is shown by unit vectors ŝ, n̂, and r̂. Vector ŝ represents the direction from a center point O of the mirrored surface 132 of the heliostat 130 to the sun. Vector n̂ represents the direction normal to the mirrored surface 132. When the mirror is not planar, n̂ may represent the normal at the center vertex of a concave or multi-faceted surface. Vector r̂ represents the direction from the center point O of the mirrored surface 132 to a target point R on the receiver 110. When n̂ bisects the angle between ŝ and r̂, sunlight will be reflected to the receiver, and the mirror is said to be on-sun. A mirror that remains on-sun while the sun is moving is said to be tracking the sun.

The mirrored surface 132 of the heliostat 130 is mounted on a pedestal 134 in the embodiment of FIG. 1. In other embodiments, the heliostat may be mounted on a frame, pole, or other rigid support structure, ground or non-ground penetrating. In the shown embodiment the heliostat kinematics, which determines mirror orientation, is parameterized by two rotations. The first rotation, $\theta$, is about an axis that is substantially perpendicular to the earth's surface. The second rotation, $\phi$, is about an axis that is substantially tangential to the earth's surface. The first rotation, $\theta$, may be termed a pan or azimuth motion. The second rotation, $\phi$, may be termed a tilt or elevation angle. In another embodiment, known as "tilt-tilt," i.e., the two rotations are about two mutually perpendicular, substantially horizontal axes, which may offer singularity-free tracking in some circumstances. The present invention is not restricted to any particular heliostat kinematic, as long as the kinematic is known, and it enables the mirror normal to span the solid angle required for sun-tracking and reflecting light into one or more cameras. In some embodiments, the mirror may be driven by stepper motors, which, via step counting, conveniently eliminate the need for position encoders and associated electronics, however they may require a home position sensor, such as a limit switch and a mechanical stop. Alternatively, the mirror may be driven by servo motors with position encoders, relative or absolute.

Forward kinematics maps the two-angle heliostat configuration to the mirror orientation, and consequently, its normal. For the idealized heliostat of FIG. 1, the two axes of rotation are aligned with vertical and horizontal directions, perpendicular, and intersect at the center O of the mirrored surface. Thus, the forward kinematics is given by a product of rotation matrices about the vertical and horizontal axes. Inverse kinematics is the process of obtaining the required angular configuration that produces a desired normal to the mirrored surface.

The forward kinematics of a generalized version of the heliostat 130, which displays misalignments with respect to a global frame and/or additional degrees of freedom within its kinematic, may be modeled by a set of parameters, $p_1, p_2 \ldots p_N$. The parameters may include rigid body translational and rotational parameters of the heliostat's base frame relative to the frame used to survey the positions of other components of the power plant. Additionally, the parameters may include parameters internal to the heliostat of significant geometric variance such as axis perpendicularity, translational offsets, step-to-orientation non-linearities, mirror mounting angles, etc.

Figure 2:
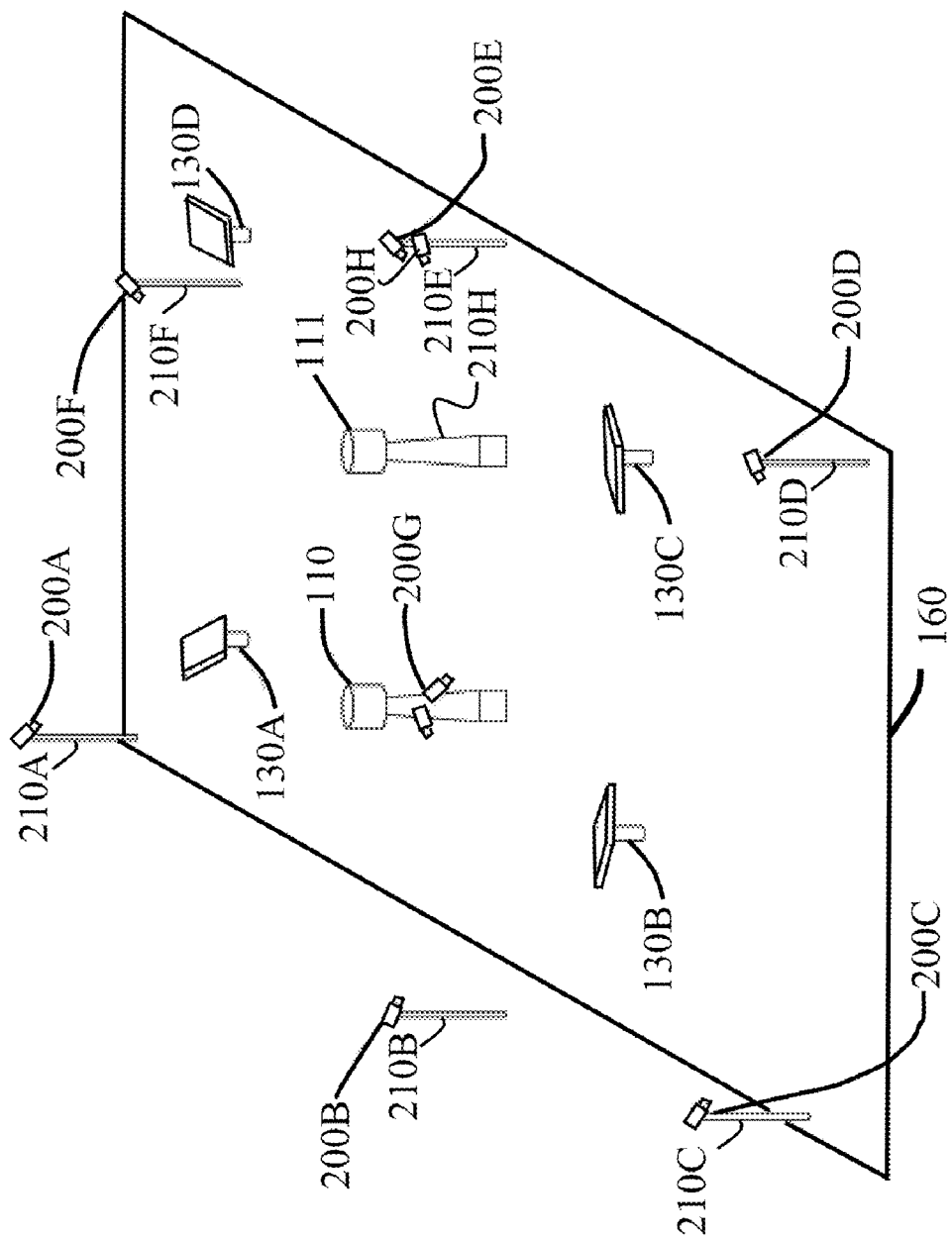
FIG. 2 is a perspective view of a central-receiver power plant according to embodiments of the present invention prior to the installation of one or more artificial light sources.

FIG. 2 shows a perspective view of a solar power plant according to aspects of the present invention. The power plant is spread over an area of land 160. In the embodiment of FIG. 2, the area of land 160 is a rectangle. In other embodiments, the area of land 160 may be another shape, for example, a circle, an ellipse, a hexagon, an octagon, or even disjoint areas. The power plant shown includes two receivers 110, 111 near a central area of the land 160. In other embodiments, the number of receivers may be fewer or greater. The power plant also includes heliostats 130a-d distributed across the land 160 to form a heliostat field. FIG. 2 shows four heliostats for illustration purposes; however, an embodiment of the invention will generally have many more heliostats, for example, one hundred to hundreds of thousands.

The power plant also includes cameras 200A-H directed toward regions of the heliostat field. Under suitable optics, the cameras 200A-H produce images that are used by image processing to detect reflections from the heliostats. The cameras 200A-H are typically mounted on towers 210A-210H. To provide sufficient visibility of the heliostats to be imaged, the height of a tower will generally be similar to the height of the receiver 110. Some of the cameras, for example, cameras 200E, 200H are mounted onto the same tower. Cameras 200A, 200C, 200D, 200E are located near the perimeter of the power plant. Camera 200B is located outside the perimeter of the power plant. Camera 200F is located within the heliostat field. Cameras 200G are mounted on a tower that also supports the receiver 110. In some embodiments, the cameras are separated by a distance similar to the heights of the supporting towers. In other embodiments, the cameras may be located in differing manners. In yet other embodiments, cameras may be mounted on wires, tethered balloons, telescoping towers, or movable tower structures, e.g., mounted on vehicles, which are typically kept stationary during calibration.

To reflect sunlight to the receiver, the system uses geometric information about the solar power plant. As previously described, the desired orientation of a heliostat's mirrored surface may be determined by inverse-kinematics based on the direction to the sun and the direction from the center of the mirrored surface to the receiver, and a set of parameters, $p_1, p_2, \ldots p_N$. The current direction to the sun may be obtained by known methods when the current time and the latitude and longitude on the Earth are known. Prior to parameter estimation, the set of heliostat parameters is known only nominally, therefore the desired orientation may only be computed nominally.

The location of each of the cameras 200A-H and receivers 110, 111 is known in a global coordinate system, for example, a celestial coordinate system, or a terrestrial one established prior to the surveying process. The locations may be obtained from standard surveying techniques, for example, by using total stations or GPS equipment. An optimization procedure using the heliostat configurations that reflect artificial light to the cameras, the location of the cameras, and the artificial light source directions when the reflections were taken may provide an estimate of the geometric parameters of the heliostat.

To accurately and rapidly estimate the parameters $p_1, p_2, \ldots p_n$, a system according to an embodiment of the present invention utilizes a configuration of cameras directed toward a field of heliostats. Following surveying or camera locations and receiver aperture geometry, basic operation of a heliostat calibration and tracking control system according to exemplary embodiments includes four phases: (1) sample acquisition, (2) parameter estimation, (3) open-loop tracking, and (4) parameter refresh. During the fourth phase, a small, rotating, set of heliostats currently tracking undergoes the first, second, and third phases to refresh their estimated parameters to account for time variability of parameters, for example, ground shift, easing in of supporting structures, or other time-dependent effects. In the sample acquisition phase, multiple heliostats search for configurations at which sunlight reflections are positively detected by the processing of images produced by the cameras. Information available at the time of a detected reflection, called a pointing sample, is recorded. Pointing samples acquired for a particular heliostat are used in the parameter estimation phase to determine a set of heliostat parameters that best fits the pointing samples. The open-loop tracking phase includes performing inverse kinematics using the estimated parameters along with knowledge of the current sun position and target location, e.g., the surveyed receiver aperture location.

Figure 3:
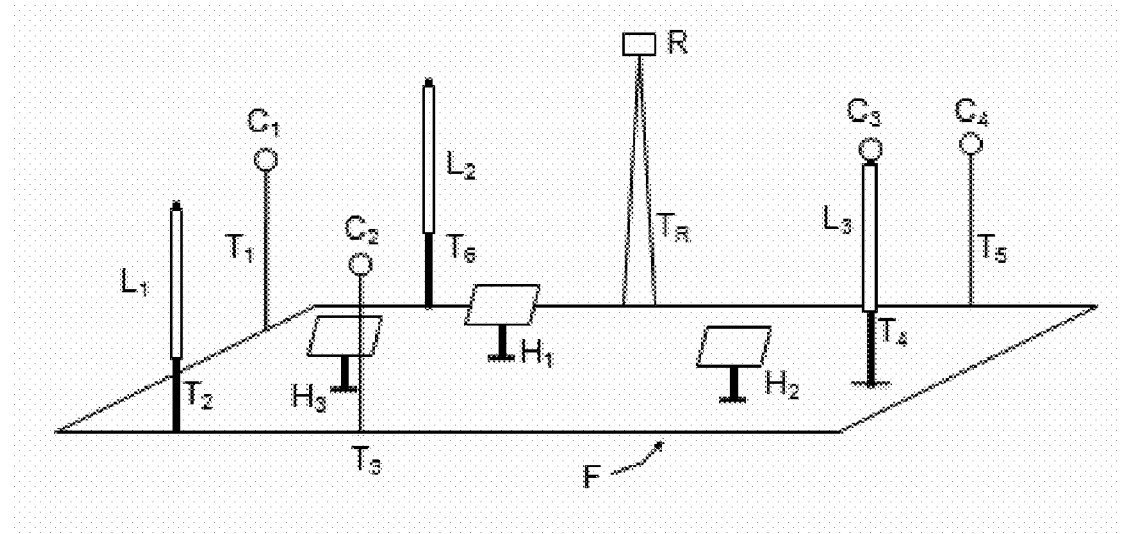
FIG. 3 is a perspective view of a central-receiver power plant according to embodiments of the present invention.

The major components of an exemplary system are shown in FIG. 3, comprising a heliostat field F, within which one or more heliostats $H_1$, $H_2$, $H_3$ are installed, close to the ground. Each heliostat controls the orientation of a mirror, along in two degrees-of-freedom under some kinematic model, e.g., an angular reference frame such as azimuth-elevation or tilt-tilt. A receiver R sits atop a receiver tower $T_R$. R's aperture is of some finite area, e.g., as required by the flux spread in a given application. A heliostat is tracking the sun if the latter is reflected correctly into R. Because of sun spread and the mirror's finite size, the reflection will typically span a finite area. Tracking here means that most of the reflected energy will fall within R's aperture. Still referring to FIG. 3, a set of vertical poles $T_1$, $T_2$, ... $T_6$, are installed around the boundary and interior of F. Mounted atop one or more such poles are image sensors, e.g., cameras, $C_1$, $C_2$, ... $C_4$, and/or curvilinear light sources $L_1$, $L_2$, $L_3$, described below. Certain poles, e.g., $T_6$, may only contain an artificial light source such as a curvilinear light source, $L_2$; other towers, such as $T_5$, may only support a camera, $C_4$. Other towers such as $T_4$, may contain both an artificial light source such as a curvilinear light source, $L_3$, and an image sensor, or camera, $C_3$.

A coordinate system is defined at some suitable location. In one embodiment, an $\{x, y, z\}$ system may be defined along the East, North, and Up directions of a celestial system, as most sun positioning algorithms used during tracking refer to the same system. It is presumed that the location and internal parameters of each heliostat are known nominally, e.g., from an architectural or engineering blueprint, and may be further refined via embodiments of the calibration system described herein. It is presumed that following a surveying process, the positions and geometry of the receiver, cameras, and light sources may be known to within a few centimeters, or in a relative frame, a sufficient degree of angular accuracy is present in the system to support further refinement via artificial light-based calibration.

Types of Light Sources

Figures 4A, 4B, 4C, 4D:
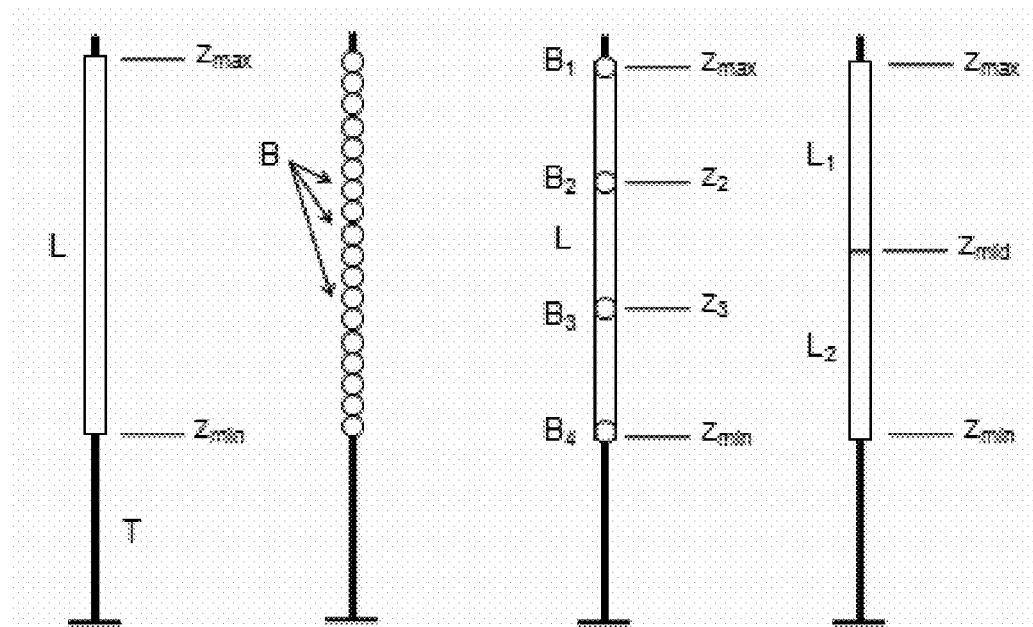
FIGS. 4A-4D depict vertically-oriented artificial light sources according to embodiments of the present invention.

Candidate artificial light sources include spot, area and curvilinear sources. Several embodiments are considered for curvilinear light sources. In FIGS. 4A-4D, an exemplary curvilinear light source is shown substantially vertical and straight, and is an omni-directional light emitter of a single color, L, that may have a length, i.e., a vertical height, of 2 m to 50 m of length. FIG. 4A depicts such an embodiment mounted to pole T, with known, i.e., accurately surveyed, center location $L=(L_x,L_y)$, and vertical extents $z_{min}$ and $z_{max}$. FIG. 4B shows an alternate embodiment in which a continuous vertical light source is emulated by several point sources, B, e.g., an array of light bulbs, linearly juxtaposed. In FIG. 4C, the embodiment of FIG. 4A is repeated with one or more point sources $B_1$, $B_2$, ... $B_N$ affixed at intermediate points along the $(z_{min},z_{max})$ interval. The height $z_2$, $z_3$, ... $z_n$, of intermediate point sources is known accurately. Furthermore, such internal point sources are separately detectable from L, e.g., by virtue of different colors and/or flashing patterns from L. The vertical light source may comprise two or more sections, and in FIG. 4D, an embodiment of a vertical light source is shown containing two sections $L_1$, $L_2$, and each separately detectable by an image sensor, e.g., $L_1$ and $L_2$ are of different colors, or have a relatively different flashing pattern. Other embodiments may make use of a horizontal curvilinear light source mounted perpendicular to a vertical curvilinear light source. Other light source embodiments are possible which are non-vertical, namely, horizontal, at an angle with respect to horizontal, curved, and cross-shaped.

Reflection Geometry and Camera Projection

In general, an curvilinear light source may be represented by a parametric form L(t), $0 \leq t \leq 1$, which describes continuously the light-emitting path traversed by it. For the case of a vertical light source of known base location $L_x$, $L_y$, and known vertical extent ($z_{min}$, $z_{max}$):

$$L(t) = \begin{pmatrix} Lx \\ Ly \\ Zmin + (Zmax - Zmin)t \end{pmatrix}, 0 \leq t \leq 1 \quad \text{[Eqn 1]}$$

Figure 5:
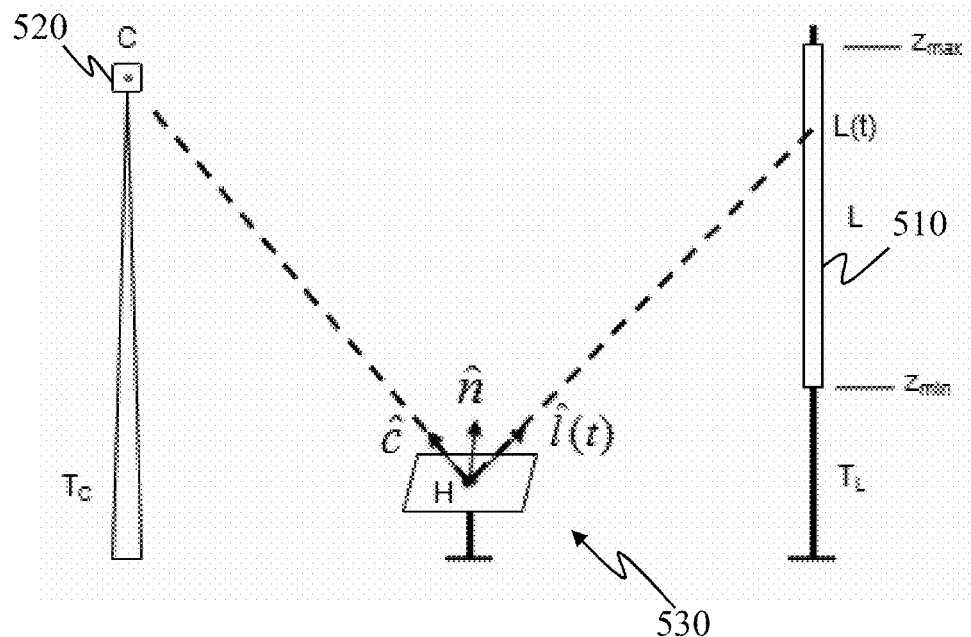
FIG. 5 depicts exemplary reflection geometry according to embodiments of the present invention.
Figures 6A, 6B, 6C:
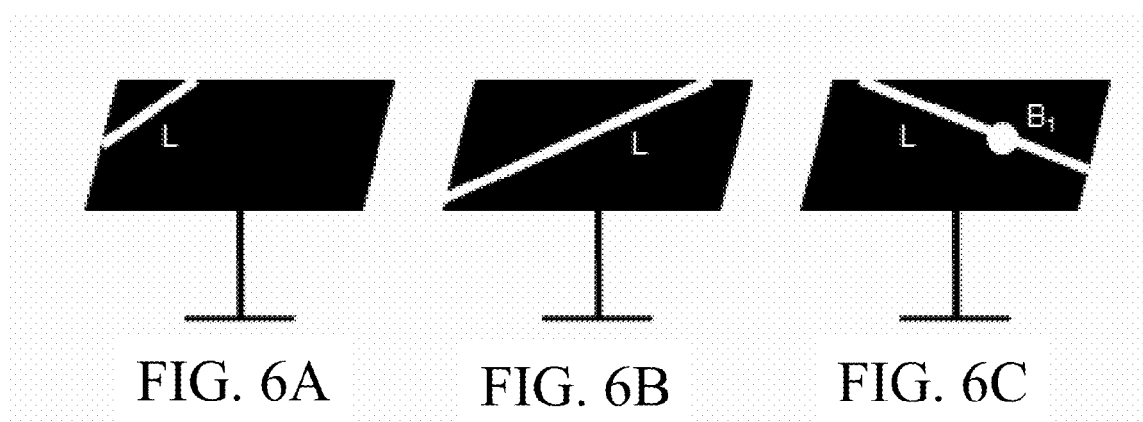
FIGS. 6A-6C depict exemplary artificial light reflections viewed on the mirror of a heliostat.

In FIG. 5, a single heliostat 530, H, is shown at an intermediate position between a sensor tower $T_C$ and a vertical light source tower $T_L$. A camera sensor 520, C, i.e. an image sensor at a known location, is shown mounted atop $T_C$, while a vertical light source 510, L, is affixed to $T_L$. H represents the center of its mirror. As shown, unit vectors n̂, Î(t), ĉ represent the mirror normal, the direction to a point on the light source, and the (fixed) direction to the camera sensor 520, relative to H. If n̂ is sufficiently close to the bisector of Î(t) and ĉ, a portion of 510, L will be visible on H from 520, C, as shown in FIG. 6A. This will be imaged at a restricted region of the image plane of C, allowing for several such reflections (e.g., coming from non-adjacent heliostats) to be detectable simultaneously and independently.

The configuration space of the heliostat's mirror normal vector may be parameterized by two angles, (θ,ϕ). The heliostat may be slewed within a contiguous region which retains the visibility of a portion of L, e.g., as shown in FIG. 6B. A center-ray search procedure may be used to estimate the centroid for the set of configurations under which such a reflection is visible.

Figure 7A:
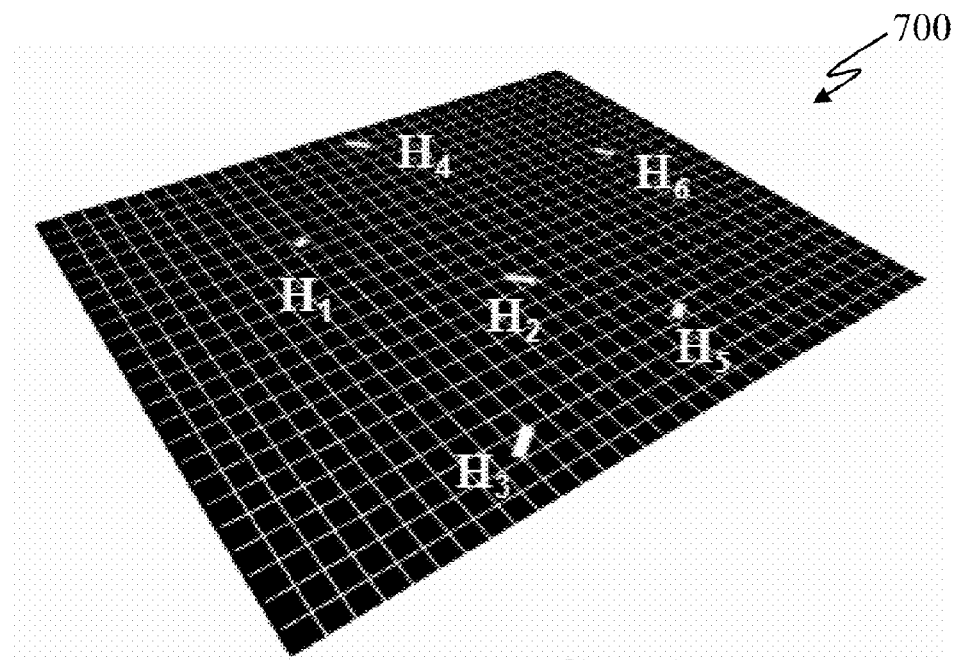
FIG. 7A depicts a perspective view of a heliostat field showing a set of heliostats and reflections of curvilinear light sources.
Figure 7B:
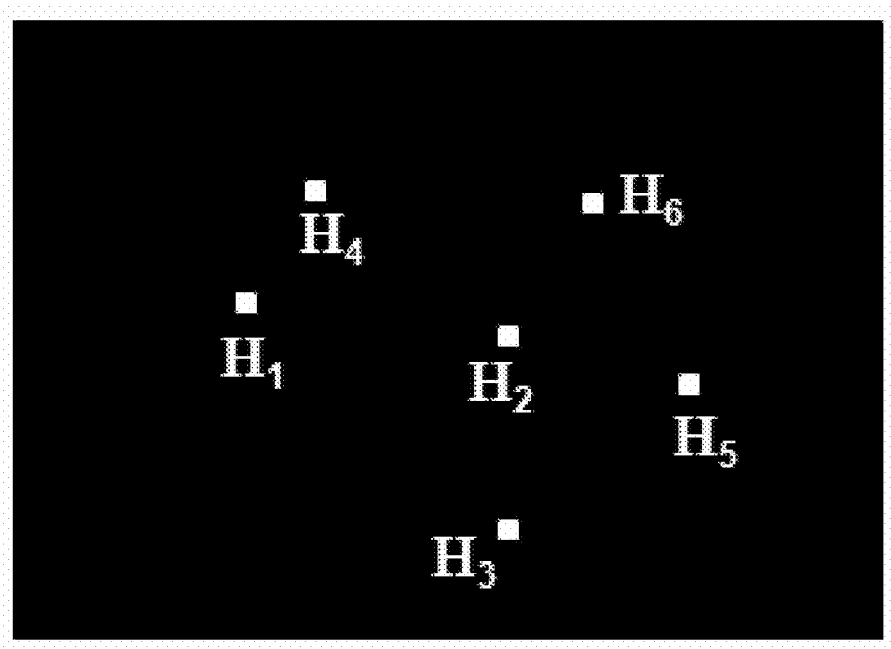
FIG. 7B depicts an array of "blobs" produced by received reflections at an image sensor.

While the precise reflected image may vary, an embodiment of the present invention determines whether such a reflection is present, i.e., a binary detection, as viewed by a particular camera. FIG. 6C shows a light source such as the exemplary light source of FIG. 4C is detected at a configuration for which both L and the point source light $B_1$ may be simultaneously detected, e.g. based on a color difference and/or a flashing difference. A camera C with narrow aperture optics, e.g., having a suitable lens or pinhole, produces a projective view of the field 700 as shown in FIG. 7A. Shown in FIG. 7A is the projection of six heliostats in a field 700, more particularly the projected reflected portions of one or more artificial light sources, in this example curvilinear light sources, toward C, and the projected reflecting array is shown sufficiently separate so the actual light being reflected may be determined uniquely based on heliostat configuration and location. FIG. 7B shows how such a composite perspective of FIG. 7A may be projected at the imaging sensor, namely, each reflecting heliostat is imaged as a separate group of contiguous binary pixels or "blobs." Because a heliostat's reflection into a camera contains faint thermal energy when compared to the reflection of the sun during sun tracking, the limit of heliostats separately detectable by a single imager is prescribed by its resolution and the maximum number of heliostats selectable in the field which are resolvable at the image plane. Accordingly, the faint thermal energy typically requires imaged heliostats to be non-adjacent to satisfy the exploitable heliostat uniqueness in the calibration processing. Typically, heliostats with few samples located in the receding end of the field will be imaged closer together in the image plane and may limit the maximum achievable parallelism. Embodiments of the present invention comprise a scheduler portion to a controller which works to ensure that heliostats adjacent in the field are not commanded to search for reflective configurations simultaneously toward a single camera.

Reflection Regions

A reflection region, also known as a "streak," refers to the characterization of a reflection of a curvilinear light source in the configuration space, (θ,φ), of a mirror. Under conditions of an ideal axis-aligned installation, forward kinematics maps configuration variables, i.e., two angles in the present example, to a unit mirror normal, n̂.

In one embodiment, an azimuth-elevation kinematic produces the following forward map:

$$\hat{n} = \begin{pmatrix} \sin(\theta)\sin(\varphi) \\ \cos(\theta)\sin(\varphi) \\ \cos(\varphi) \end{pmatrix} \quad [\text{Eqn. 2}]$$

Letting ĉ and Î(t) be defined as above as unit vectors representative of the direction of the camera and light source respectively, the bisection constraint becomes:

$$\frac{\hat{c} + \hat{l}(t)}{\|\cdot\|} = \hat{n}, \, 0 \le t \le 1 \quad [\text{Eqn. 3}]$$

For a choice of t in the (0,1) interval, a unique normal $\hat{n}=(n_x, n_y, n_z)$ is prescribed; inverse kinematics refers to mapping the required normal to a (θ,φ) pair, and in the case of an Azimuth-Elevation (az-el) kinematics, such an inverse map may be expressed as:

$$\begin{bmatrix} \theta \\ \varphi \end{bmatrix} = \begin{bmatrix} \tan^{-1}(n_x/n_y) \\ \cos^{-1} n_z \end{bmatrix} \quad [\text{Eqn. 4}]$$

Accordingly, the (θ,φ) which satisfy Eqn 4 for all possible sweeps of "t" along one-dimensional (1d) locus in a configuration space is a reflection region, as shown in FIG. 8A as the curve σ. Because of the finite angular extents of both the mirror and the artificial light sources of the types described herein, σ will be thickened somewhat around a substantially one-dimensional region of configuration space. For purposes of comparison, FIG. 8B shows the case where a disc source such as the sun ŝ is used as the directional light source, producing a point-like region σ', the point-like region being thickened by sun-spread and the mirror's finite size, of correct bisection, satisfying:

$$\frac{\hat{c} + \hat{s}}{\|\cdot\|} = \hat{n} \quad [\text{Eqn. 5}]$$

Searching for a Reflection

Referring to FIG. 9, the configuration S required for a directional area light source, such as the sun, to be reflected into a known camera aperture, C, may be computed from Eqn. 4 and inverse kinematics, using nominal positional and geometric parameters for H, and C, where, if the disc light source is indeed the sun, its position may be obtained from an algorithm known to those of ordinary skill in the art. Due to tolerances in these parameters, S may not, in general, fall inside the region σ' of detectable reflections. Given known tolerances in manufacturing and installation, one may define the expected error distance from S to the centroid as may be represented by ε (see FIG. 9). Because the process is unaware as to which quadrant σ' lies respective to S, then in an effort to minimize the expected-time process required to detect a reflection, the particular heliostat may be commanded to execute a spiral-like motion in configuration space, as shown in FIG. 9. Particularly, the search path may start with departing from S, and then P' may represent a piecewise linear, or curved, spiraling path that may be executed until a reflection is detected, i.e., when any point in σ' is crossed. Because the spiral search spans a substantially two-dimensional region, the time until detection is proportional to $\epsilon^2$. Once a reflection is detected, a second procedure spans the set of reflection-producing configurations, e.g., as produced by incident light spread and/or the mirror's finite dimensions, so as to the estimate the centroid of σ'. At this stage of the process, a point-source sample, termed here a "directional" sample (DS), containing the tuple (C, Î, θ, φ) is recorded and associated with the heliostat in question, containing the following data: (a) the camera C (or its index in a list) which has detected the reflection; (b) the direction Î from which the (sun) light is shining from; and (c) the configuration (θ,φ) associated with the centroid of σ'. If N is the number of parameters to be estimated for heliostat 530, H, i.e., the correct set of parameters to be estimated is a point in N-dimensional space, then a PSS imposes, with the exception of a few degenerate cases, two independent constraints in this space, i.e., the PSS is associated with an N-2 dimensional surface in that space.

Figure 10A:
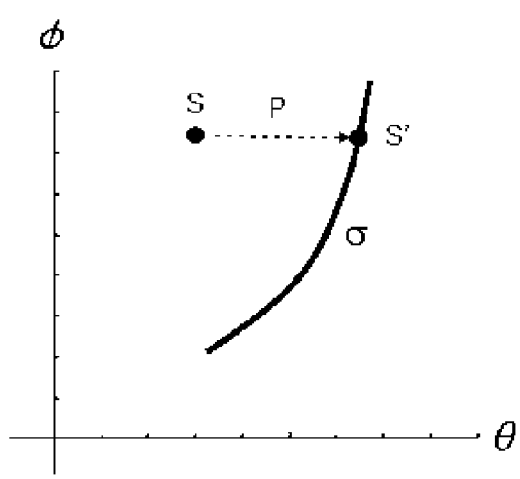
FIG. 10A depicts a search path in configuration space to a reflection region based on motion along one degree-of-freedom.
Figure 10B:
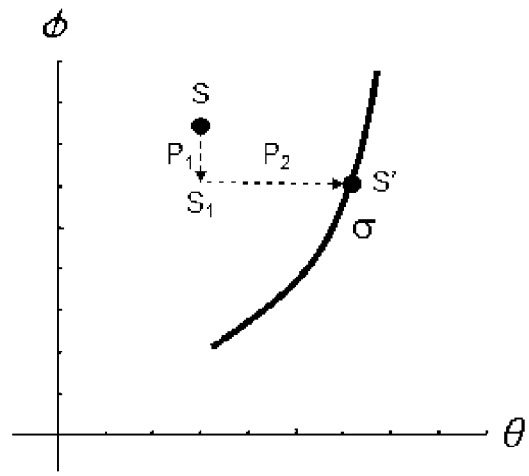
FIG. 10B depicts a piecewise elementary search path in configuration space.
Figure 10C:
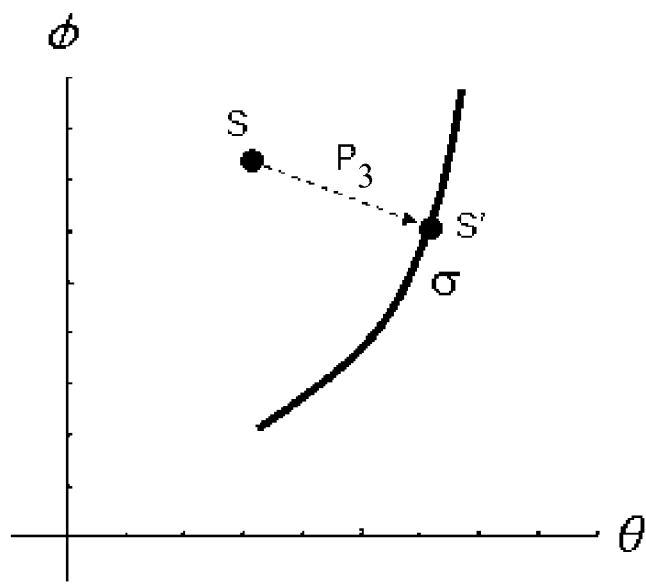
FIG. 10C depicts a search path in configuration space to a reflection region based on motion along two degrees-of-freedom.

FIGS. 10A-10C depict an alternative search process embodiment of the present invention where the region of reflection, σ, of an artificial light source particularly that of a curvilinear light source, as shown in a heliostat's configuration space (θ, φ), is searched. One may continue to define the expected distance from S to the curved region of reflection as represented by ε. Because the region of reflection, σ, spans a 1d curve, the controller may execute steps/tests to determine or otherwise select an elementary path, P, from S; particularly a path involving a single degree of freedom. At some configuration S', a reflection may be detected. At this stage of processing, a centering procedure may be performed to estimate a center configuration in the degree of freedom which causes a reflection, i.e., a type of cross-sectional centroiding may be performed. One exemplary method continues the elementary 1d motion until the reflection disappears, and then, based on the center of the reflection, the process generates configurations as an estimate of the centroid. This exemplary search may be comprised of one or more 1d scans, depending on the known structure of the light source. Referring to the exemplary embodiment of FIG. 10A, a non-directional sample (NDS), containing the tuple (C, L, θ, φ) is acquired and stored in a list of samples associated with H, where: (a) C is the camera C (or its index in a list) which has detected the reflection; (b) $L=(L_x,L_y)$ is the location the intersection of the light source's axis with the x-y plane; and (c) (θ,φ) is the configuration associated with the centroid of σ.

An NDS typically imposes only one constraint in the space of unknown heliostat parameters since it is associated with a set of possible light source directions. In the case where S is expected to fall outside of the range of the region of reflection, a piecewise approach path may be chosen comprising single degree-of-freedom (dof) motions $P_1$ and $P_2$, as shown in FIG.

10B. Another exemplary embodiment comprises search path $P_3$ involving both degrees-of-freedom simultaneously, as shown in FIG. 10C. In the curvilinear light source cases, the time until detection may be expected to be proportional to $\epsilon$, rather the $\epsilon^2$ proportionality in the point-light sources. For these exemplary embodiments, a DS may be acquired upon detecting a reflection and finding its cross-sectional centroid.

The method described in FIG. 10A may also contain a time-out test, e.g., if the region of reflection σ was not flagged after a given angular range of motion, an error may be issued, and then, after such a timeout, the search direction may be inverted as to emulate the spiral. This exemplary alternative embodiment differs from the previous exemplary method of FIG. 10A in that given the curvilinear geometry of the region of reflection, the average expected time would typically be linear with respect to $\epsilon$. That is, if the true sun tracking parameters of the heliostat are known with approximate certainty, the curvilinear region of heliostat configurations for which a light source is detectable by an image sensor works to reduce the number of turns of the spiral needed to obtain said reflection.

Figure 11:
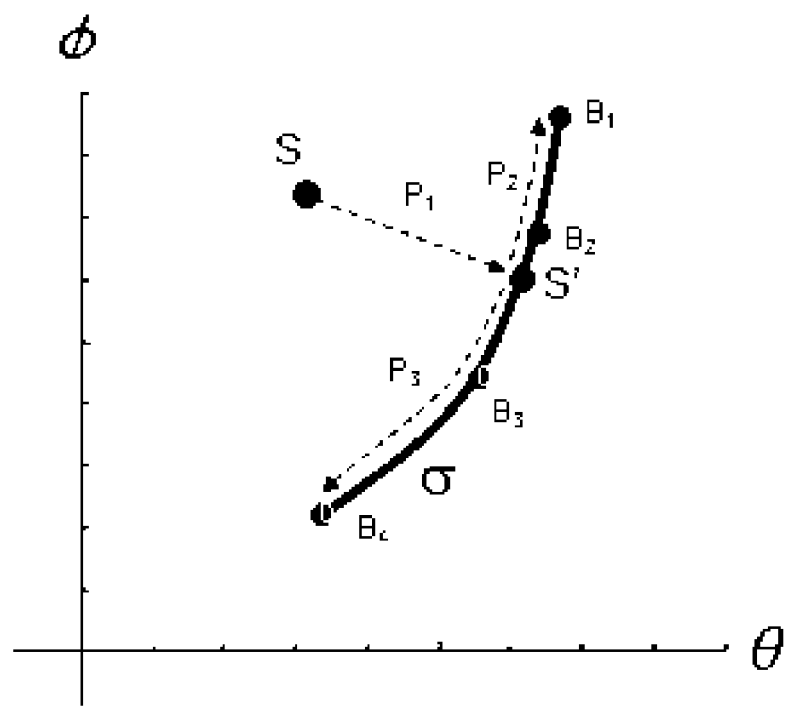
FIG. 11 depicts a search path in configuration space for a vertical, curvilinear light source having point source light emitters in its interior, i.e., within its span.

FIG. 11 shows a search path approach for the case of a light source depicted in FIG. 4C. The heights (respective to ground) of each point source $B_1$, $B_2$, $B_3$, $B_4$ are known and equal to $z_{min}$, $z_2$, $z_3$, $z_{max}$. Departing from S, i.e., a point that may be determined via inverse kinematics, an elementary path $P_1$ may be chosen which will intersect with σ at a configuration $S'=(\theta_{S'}, \phi_{S'})$. An NDS may be acquired then. Using a closed-loop approach, e.g., slewing the mirror so the reflection may be maintained, σ is followed along one chosen direction, e.g., a direction of increasing $\phi$, along $P_2$, until feature $B_2$ is detected, where such detection may be on the basis of flashing or a different color. Accordingly, the mirror will be imaged as in FIG. 6C. For illustrative purposes, this exemplary configuration may be termed configuration $(\theta_2, \phi_2)$ and a DS is acquired because the position of $B_2$ is known and it serves the process as a directional source. The motion along $P_2$ continues until, through a similar process, $B_1$ is detected (and/or the end of the reflection region is detected by its disappearance, i.e., its height is $z_{max}$), at configuration $(\theta_1, \phi_1)$; again a DS may be acquired here. The mirror is then commanded to move back to S' and then proceed along $P_3$ until $B_3$ and $B_4$ are detected at configurations $(\theta_3, \phi_3)$ and $(\theta_4, \phi_4)$, generating two more DSs. The set of samples acquired will be as follows in Table 1:

TABLE 1

| Event | Description | Sample Stored | Type of Sample, # of Solve Constraints |
| --- | --- | --- | --- |
| 1 | Reflection region is intersected at S' | $(C, \{L_x, L_y, -1\}, \theta_{S'}, \phi_{S'})$ | NDS, 1 |
| 2 | $B_2$ detected | $(C, \{L_x, L_y, z_2\}, \theta_2, \phi_2)$ | DS, 2 |
| 3 | $B_1$ or upper end of reflection region detected | $(C, \{L_x, L_y, z_{max}\}, \theta_1, \phi_1)$ | DS, 2 |
| 4 | $B_3$ detected | $(C, \{L_x, L_y, z_3\}, \theta_3, \phi_3)$ | DS, 2 |
| 5 | $B_4$ or lower end of reflection region detected | $(C, \{L_x, L_y, z_{min}\}, \theta_4, \phi_4)$ | DS, 2 |

Note that a total of four DS and one NDS are acquired above, i.e., nine total constraints are imposed, and that these samples may span only a small region of the heliostat's range of motion in $(\theta, \phi)$ space. In general, these constraints may not be sufficiently independent, in the sense of constraint surface orthogonality around the optimal solution. Orthogonality of a set of constraints is related to the angular distance between the light sources in the case of DSs. For example, the most orthogonal exemplary samples in the above set of TABLE 1 are the third and fifth events, since they correspond to the endpoints of the light source. Increasing the orthogonality may be achieved via the reflections being obtained from light sources separated widely about the heliostat field—by about a characteristic distance such as receiver tower height. Also, increasing the number of samples beyond minimum orthogonality will filter measurement noise via the law of averages.

A similar search process may be executed with the split-feature light source of FIG. 4D, with the following phases: (a) an elementary approach from S to the region of reflection until a reflection is detected. NDS acquired; (b) based on the recognized segment, choose a direction to sweep the reflection region, e.g., determine a sweep direction base on a color or flashing pattern; (c) sweep until reflection region is no longer detected, e.g., the sweep has reached an end-point, acquire DSs, and reversed sweep direction; (d) sweep light source till change in color or flashing feature is detected, acquire a DS, since the height at which the feature changes is known; and (e) sweep till the endpoint of other segment is reached, and acquire a DS.

Parameter Estimation

Some embodiments of the invention comprise several objects, one of which may be the estimation of the unknown geometric parameters required for a heliostat, H, to accurately track the sun in open-loop mode. For example, $p_1$, $p_2$, ..., $p_n$ may represent all such N parameters of a heliostat, such as Cartesian position and Euler pose angles (roll, pitch, and yaw), and internal kinematic parameters such as internal angle between axes, mirror mounting angles, etc. In addition, $\theta_1, \theta_2, \ldots, \theta_M$ may represent the configuration variables, e.g., pan and tilt angles, where the configuration variables may be presumed to be commanded to sufficient precision by an external controller. Let FK(•) (for Forward Kinematic) denote a generic map from all N parameters, configuration variables, to the mirror normal:

$$\hat{n}=FK(p_1,p_2,\ldots,p_N,\theta_1,\theta_2,\ldots,\theta_M).$$

An exemplary embodiment may have M=2, e.g., az-el or tilt-tilt kinematics, and N=6, e.g., the six rigid body parameters of a heliostat. Another exemplary embodiment may have M=2, and N=9, i.e., the embodiment includes the six rigid body parameters plus three parameters which govern the internal offset angles of the heliostat.

$L_j(t)$, $0 \leq t \leq 1$, is the parametric which gives the location of points on the light source continuously, e.g., as in Eqn 1 for a vertical light source. If the location along the length where the reflection is produced is not known, it is associated with an NDS, i.e., t may be anywhere in the (0,1) range. If such a location is known, e.g., if reflection production location determination is based on feature-extraction and/or endpoint cut-offs, then it is associated with a DS, i.e., the location along the light is represented by $L_j(t_0)$, for a known $t_0$.

Parameter estimation may be based on: (a) installing one or more image sensors and one or more light sources around the heliostat field; (b) commanding H along its degrees of freedom to search for a configuration which produces a centered reflection of some known light source $L_j$ into a known image sensor $C_j$; (c) when such a reflection occurs, a sample $(C_j, L_j(t), \theta_1, \theta_2, \ldots, \theta_M)$ is added to a list associated with H; and (d) estimate a best fit set of parameters based on a list or set of samples.

For each sample $(C, L(t), \theta_1, \theta_2, \ldots, \theta_M)$ gathered, the following bisection constraint must hold:

$$FK(p_1, p_2, \ldots, p_N, \theta_1, \theta_2, \ldots, \theta_M) = \frac{\hat{l}(t) + \hat{c}}{\|\cdot\|} \quad \text{[Eqn 6]}$$

Where $$\hat{l}(t) = \frac{L(t) - H}{\|\cdot\|} \text{ and } \hat{c} = \frac{C - H}{\|\cdot\|}$$

are the unit vectors toward the light source and toward the image sensor. With K samples, a system of K generally non-linear equations such as represented by Eqn. 6 will be defined. An optimal parameter set: $p_1, p_2, \ldots, p_N$, may be estimated which best fits that system. In an exemplary embodiment, an error functional may be defined for each equation as the (squared) magnitude (or magnitude squared) of left-hand minus right hand sides of Eqn 6. In such an embodiment, an optimal parameter set may be found which minimizes the sum of such errors, i.e., parameter solutions may be based on a non-linear least squares optimizer. Because there are N parameters, the samples must offer at least N constraints for such a system to be solved. Let "DS" represent the number of directional samples gathered, e.g., samples from point light sources, and NDS the number of non-directional samples, e.g., gathered from curvilinear light sources. Since directional (resp. non-directional) samples impose two (resp. 1) constraints, a necessary condition is 2DS+NDS≧N for the non-linear system to be solvable, i.e., for an exemplary best-fit solution to be found. This condition is sufficient if said constraints produce enough orthogonality, i.e., the Jacobian of the non-linear system of equations is full-rank.

Solving Base Pose with Multiple Light Sources

Figure 12A:
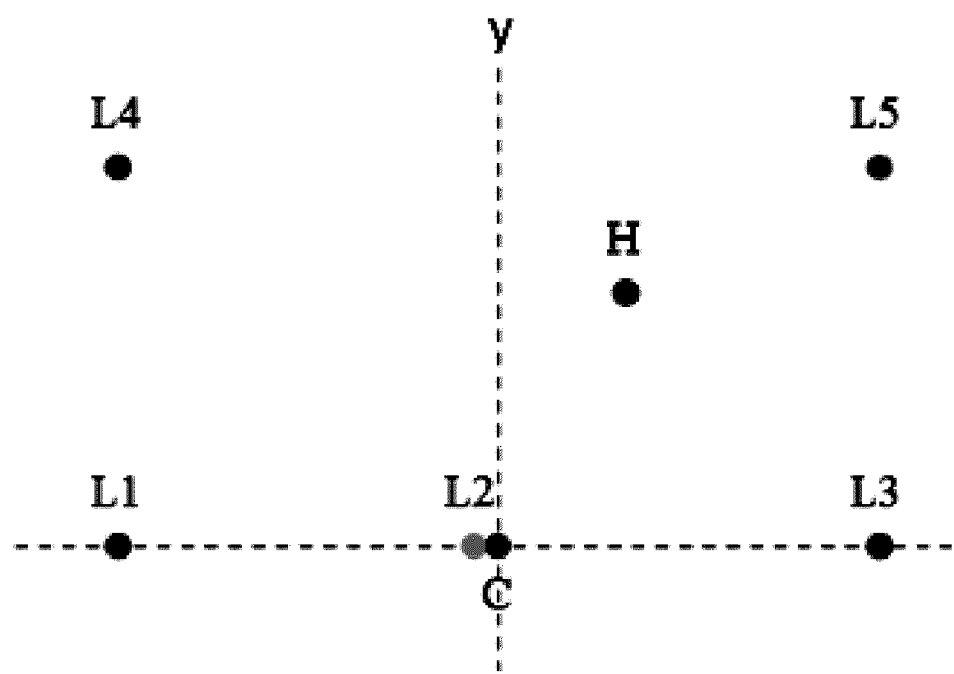
FIG. 12A depicts in a top view a heliostat field having a camera (C) at the origin, a heliostat (H), and five light sources ($L_1$ through $L_5$)
Figure 12B:
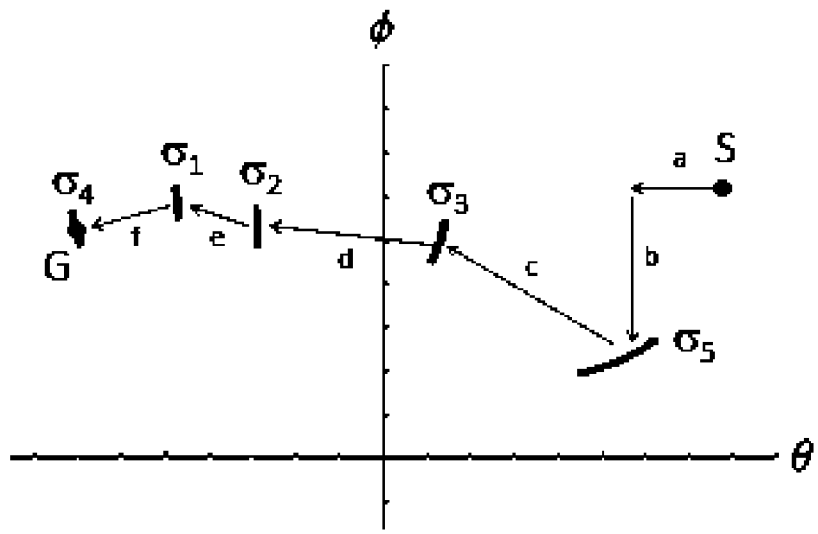
FIG. 12B depicts in configuration space, a search path starting a location S and visiting reflection regions corresponding to the light sources of FIG. 12A.

In FIG. 12A, a top view of an heliostat field is shown having an image sensor, C, at unit height above the origin, i.e., C=(0,0,1), a heliostat, H, positioned at the first quadrant respective to C, and the location of five vertical light sources $L_1, L_2, L_3, L_4, L_5$, distributed around the first and second quadrant about C. Each light source may be presumed to extend from $z_{min}=0.5$ to $z_{max}=1$. FIG. 12B depicts an exemplary configuration space for H showing the five reflection regions, i.e., $\sigma_1, \sigma_2, \ldots, \sigma_5$, associated with reflections from each of five light sources, respectively. The locations and orientations of the reflection regions vary within the configuration space $(\theta,\phi)$ as the relative geometry of each light respective to H also varies.

FIG. 12B shows a starting configuration, S, and a search path composed of motions a, b, c, d, e, and f (shown as simplified straight lines), visited by H as it crosses each of the reflection regions, in this case in the order $\sigma_5, \sigma_3, \sigma_2, \sigma_1, \sigma_4$, corresponding to centered reflections from light sources $L_5, L_3, L_2, L_1, L_4$, respectively. While such an ordered crossing may vary from process to process, a preferred embodiment has an order of crossing that is selected to minimize the total expected configuration space path length, as shown in FIG. 12B.

Assuming one DS is acquired each time a configuration of known (x,y,z) is reached within a reflection region, K=5 reflection region allows for a system of up to 10 parameters to be solved. In general, an overconstrained sample set provides more stable solutions for the heliostat pose variables, i.e., 2DS+NDS>N, or a rectangular Jacobian which is full-rank, so noise and random fluctuations in samples gathered may be averaged or otherwise filtered from the ensemble of data.

Data Flow Architecture

Figure 13:
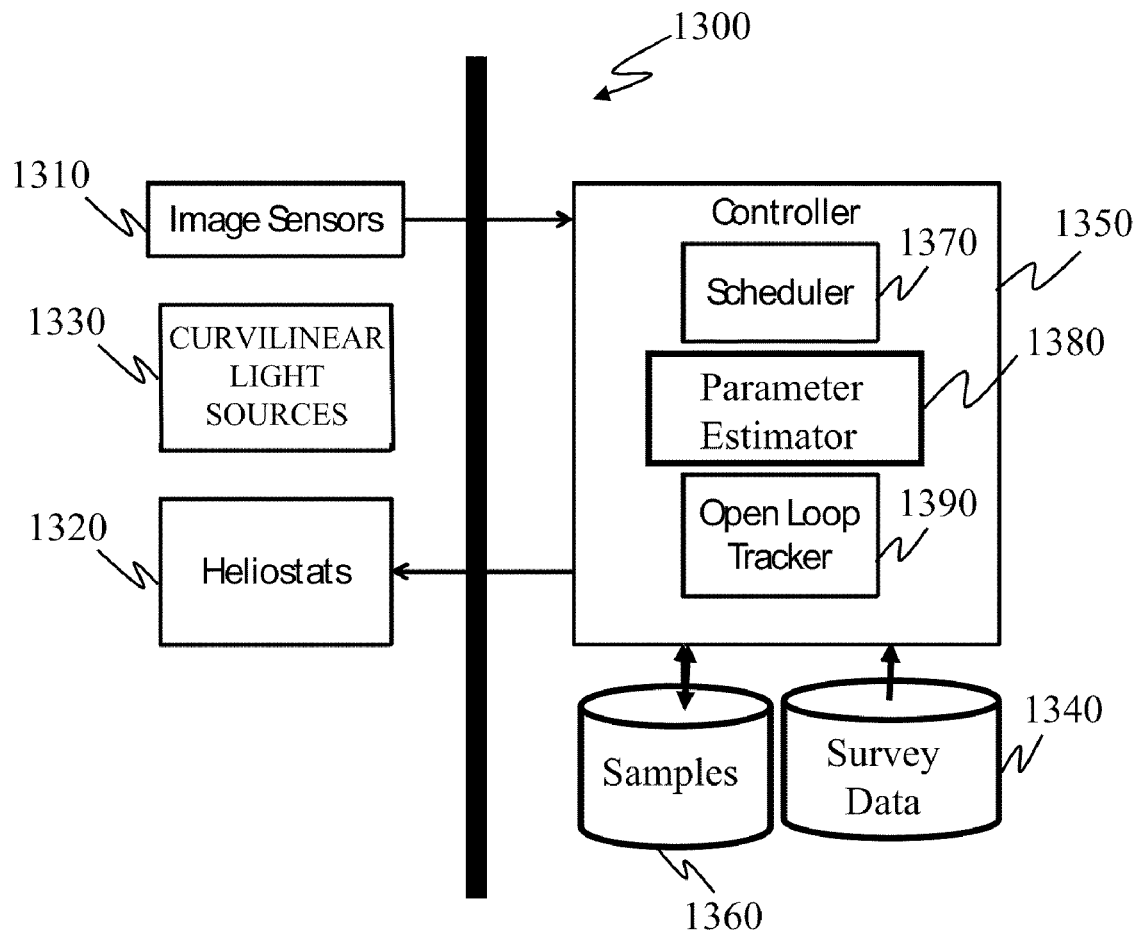
FIG. 13 is a top-level functional block diagram of a system embodiment of the present invention.

FIG. 13 shows the two sides of the present invention as split 1300, from a data flow perspective: a hardware section and controller-based software section. Hardware includes sensors 1310 and heliostats 1320. The artificial light sources, e.g., the curvilinear light sources 1330 may be controllable. For example, in some embodiments, the artificial light sources may change color or produce flashing patterns responsive to controller signals. In some embodiments, artificial light source positions, and/or the curvilinear light source orientations may be reoriented responsive to controller signals.

The software, or data-centric side of the architecture, comprises: (a) a survey data store 1340; (b) a controller 1350; and (c) a sample data store 1360. The survey data store 1340 comprises data gathered during a post-installation physical survey of the field, which typically comprises accurate locations, e.g., x,y,z, locations that may be refined via calibration, of all camera sensors, light source locations and/or parameterization equations, and the receiver aperture geometry and/or location (for sun tracking). Additionally, the survey data store 1340 may comprise nominal positions, e.g., positions as they may be available from an engineering drawing or blueprint, and internal parameters of heliostats, e.g., parameters as measured during manufacturing and installation processes, and such parameters may include both mirror center location, internal angle between axes (typically 90 degrees), desired mirror mounting geometry, etc.

The controller may comprise three functional modules:

(a) A scheduler, or scheduler module 1370, that, when executing instruction and/or responsive to circuitry, maintains a list of heliostats having parameters that have not yet been estimated. That is, the scheduler 1370 maintains a list of uncalibrated heliostats, i.e., heliostats whose DS+2NDS is below a minimum desirable threshold and/or their mutual orthogonality and noise-filtering capabilities are still deemed insufficient for robust optimization. The scheduler 1370 may periodically place uncalibrated heliostats into motion and search patterns to produce artificial light source reflections, e.g., curvilinear light source reflections that may be detected by a camera of choice according to the calibrations instructions. The reflection search process may be initiated using inverse kinematics based on nominal heliostat parameters, and light source and image sensor locations. The scheduler 1370 also ensures heliostats chosen for search may be resolved independently at the image sensor. That is, the scheduler 1370 may select uncalibrated heliostats based on the extent that they may project onto the image sensor as blobs which are resolvable, i.e., occupying non-intersecting pixel clusters. For example, one criterion may be for adjacent heliostats not to be involved in producing samples with the same camera simultaneously, though they may be commanded to produce samples with different cameras. Once enough samples are acquired for a given heliostat, the parameter estimator, or parameter estimator module 1380, executes parameter estimation via an optimization method. As centered reflections are produced, samples are stored within the sample data store 1360.

(b) A parameter estimator 1380 receives the list of samples gathered for the heliostat and available at the sample data store 1360 as input to an optimization module which finds a set of parameters that may produce best-fits of the data. The calibrated parameters, i.e., the parameters improved or refined based on the original/nominal set may then be stored back into the survey data store 1340.

(c) An open-loop tracker, or open-loop tracker module 1390, may be based on a sun-tracker algorithm and the parameters computed by the parameter estimator 1380, generates commands to one or more actuators so that the heliostat may track the sun with significant accuracy. It may be presumed that during tracking, both the target receiver position and instantaneous sun direction are known, e.g., as queried from a sun-position algorithm and may be an algorithm as described in "Solar Position Algorithms for Solar Radiation Applications," Ibrahim Reda and Afshin Andreas, National Renewable Energy Laboratory (NREL), 2008. The required angle of the heliostat normal vector may be calculated from these values, and the motion of the heliostat needed to achieve this normal vector is calculated from its pose.

The controller may be embodied via one or more central processing units (CPUs) having addressable memory and/or stores and the processing may be effected across a local bus and/or across a distributed network. Furthermore, a module of the exemplary controller 1350 described herein may be further subdivided and combined with other functions so long as the function and processes described herein may be performed. The various modules may also be implemented in hardware, or a combination of hardward and software, e.g., firmware.

Search

Figure 14:
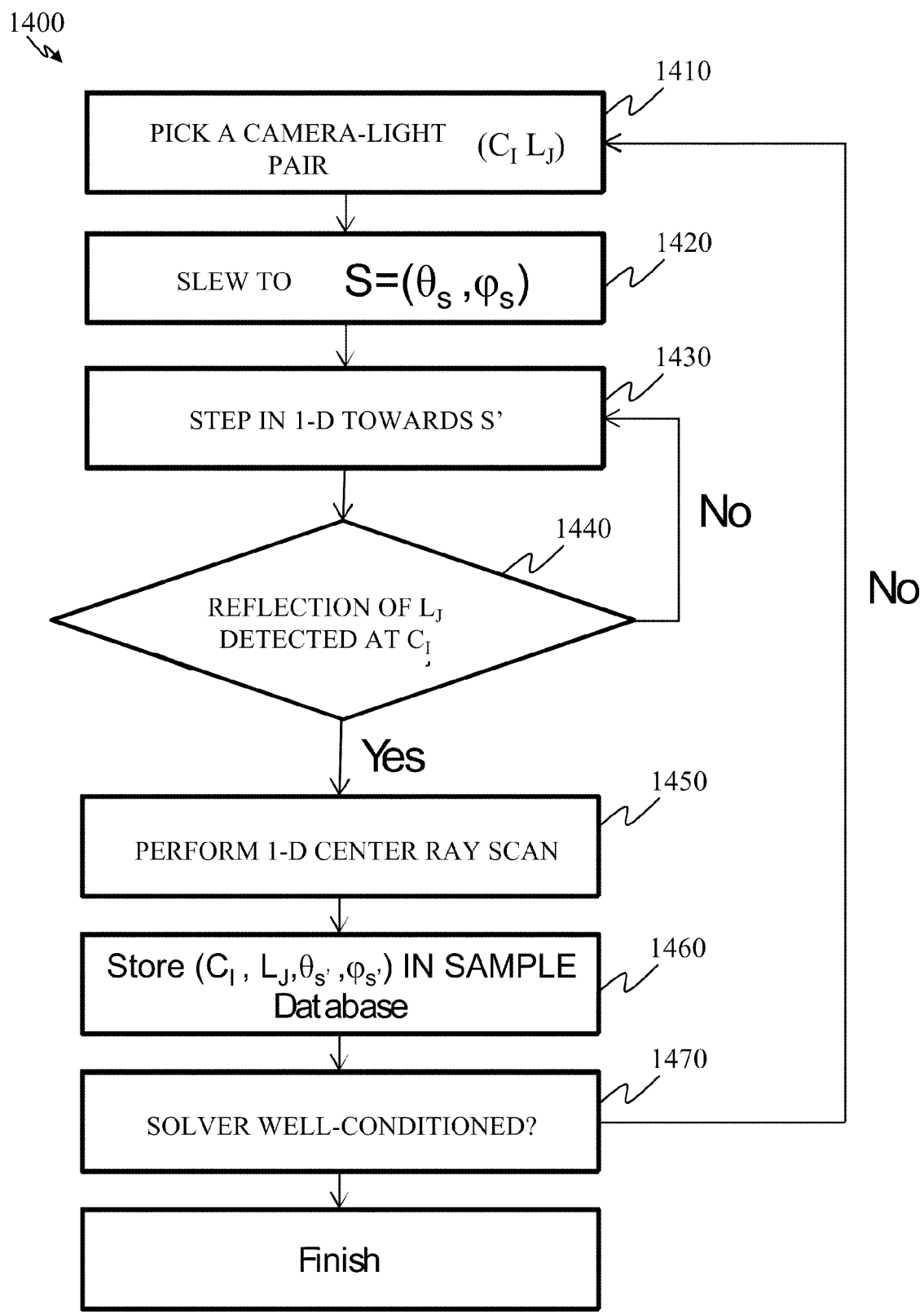
FIG. 14 is a top-level process flowchart depicting steps of calibrating based on a reflected light source.

FIG. 14 shows in a top-level process flowchart 1400 the computer-based method of NDS gathering by the scheduler for a given heliostat H. Given a set of cameras $C_i$ and light sources $L_j$ visible to the heliostat in the field (see FIG. 3), a particular camera-light source pair $(C_i, L_j)$ is selected 1410, e.g., a selection that may be based on a criterion of sufficient angular distance (related to orthogonality) between all previously acquired samples. Based on the nominal parameters, inverse kinematics may be applied to estimate the start configuration, $S=(\theta_s, \phi_s)$, to which the heliostat physically slews 1420. Given the expected geometry of the reflection region associated with $L_j$, an expectation computed still using H's nominal parameters and $L_j$'s known geometry, a simplified, e.g., 1d, path is chosen 1430 in H's configuration space likely to intersect with the reflection region. H is moved along such path while such a reflection 1440 is not detected by $C_i$. Once the reflection region is reached, say, at point S', a local centering procedure 1450 is executed which estimates the central axis of the reflection region, since the latter is somewhat thickened by the angular extent of the H's mirror. At this point a sample 1460, e.g., a NDS, is acquired, and the process repeats until enough (based on rank, orthogonality, and noise filtering) samples are acquired from various pairings of light-sources with image-sensors, at which point parameter estimation may be performed by the solver 1470. In another embodiment, a path may be followed from S' along reflection-producing configurations until the upper or lower endpoint of the light source were detected, e.g., on the basis of reflection disappearance. In such, a case a DS would be acquired.

Figure 15:
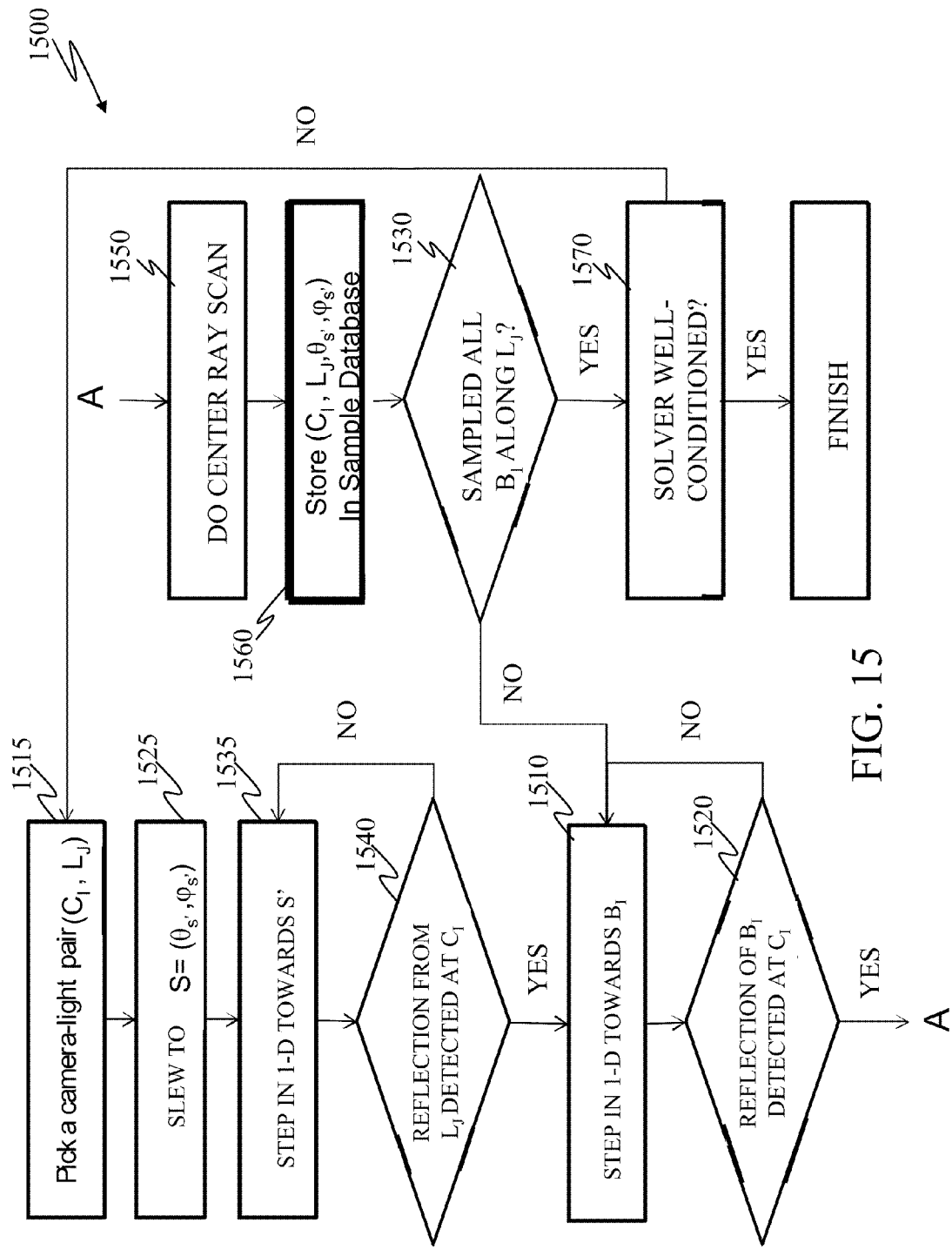
FIG. 15 is a top-level process flowchart depicting steps of calibrating based on a reflected curvilinear light source having internal beacons.

FIG. 15 shows in a top-level process flowchart 1500 a similar sample gathering, for the case of a vertical light source with internal point-source emitters $B_i$, and/or features, e.g., as shown in FIG. 4C and FIG. 4D. As in the procedure before, the heliostat slews from S to S', but then proceeds to follow the reflection region 1510 till one or more point source emitters are detected on the basis of some feature change 1520. At each such stop a directional sample 1530 is acquired. Once one or more are visited, the procedure terminates.

Some calibration embodiments of the present invention operate after sundown and before daybreak. Several heliostats may have their incident artificial light directed to a single camera. An entire array of heliostats may be calibrated simultaneously at night where preferably there is sufficient computational power to address the increased parallelism over calibrating portions of the array, and preferably where there is a significant number of image sensors to increase both orthogonality and parallelism.

Some calibration embodiments of the present invention may comprise light emitters within sun spectrum dips such as those emitting in the narrowband of 1900-1930 nm, i.e., the water absorption band, so as to increase signal-to-noise ratio at the detectors with respect to sunlight. In addition, the one or more cameras may each be configured with gain control and/or a shutter synchronized to flashing light emissions. For example, LED-based lights or Low-Pressure Sodium light sources might be flashed at $\frac{1}{100}$ to $\frac{1}{1000}$ duty cycles and accordingly, at 100× to 1000× stronger luminous power, enabling certain embodiments to operate daytime. Accordingly, embodiments of the present invention may operate during daylight, in darkness, concurrently or alternatively, in the presence of the sun and/or the moon, by observing one or more flashing lights via one or more synchronized cameras, e.g., low-duty cycle high intensity light flashing lights with synchronized cameras. An exemplary low-duty cycle may be a flash of 100 msec followed by an off period of 900 msec during daylight conditions and a flash of 200 msec followed by a off periods of 1.8 sec during moonlight conditions. Additionally, the scheduler may exclude sample acquisition from heliostats whose reflected light might include the sun, a star, the moon, or another luminous object source foreign to the calibration intent, unless it is the intent to use the known position of said objects as an explicit light source (e.g., the position of the moon can be obtained via a moon-positioning algorithm).

One of ordinary skill in the art will also appreciate that the elements, modules, and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. Sections headings of the present application should not be read to limit claim scope. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above. Accordingly, the invention has been disclosed by way of example and not limitation, and reference should be made to the following claims to determine the scope of the present invention.

What is claimed is:

1. A sun-tracking system for a central receiver solar power plant, comprising:

a heliostat field comprising heliostats for reflecting sunlight to a receiver;

a plurality of artificial light sources;

one or more cameras directed toward at least a subset of the heliostats and configured for producing images of the heliostats; and a controller configured for processing the images, controlling the heliostats, and configured for estimating parameters of the heliostats for open-loop sun-tracking based on artificial light source reflections, from one or more heliostats, received by the one or more cameras.

2. The system of claim 1, further comprising a plurality of towers supporting at least some of the plurality of artificial light sources.

3. The system of claim 2, wherein at least some the towers supporting the cameras are within the boundary or in the vicinity of the heliostat field.

4. The system of claim 2, wherein at least one tower-supported artificial light source is configured to provide vertically-oriented curvilinear light source.

5. The system of claim 2, wherein at least one tower-supported artificial light source is configured to provide horizontally-oriented curvilinear artificial light source.

6. The system of claim 1, further comprising a solar receiver supported by a tower and at least one of the cameras is mounted on the tower supporting the solar receiver.

7. The system of claim 1, further comprising a plurality of towers supporting at least some of the cameras.

8. The system of claim 1, wherein the at least one of the cameras is further configured to produce images of curvilinear light source reflections by two non-adjoining heliostats of the heliostats, corresponding to two non-contiguous blobs.

9. The system of claim 1, further comprising: a data store of acquired heliostat pointing samples; a data store of heliostat parameters; and a data store of surveyed locations of the cameras and the heliostats, wherein the controller is further configured to access the data store of acquired heliostat pointing samples and the data store of heliostat parameters and to retrieve data from the data store of surveyed locations.

10. The system of claim 9, wherein the controller is further configured to:
acquire heliostat pointing samples by commanding motions to the heliostats; and utilizing detection of reflections by the cameras,
estimate heliostat tracking parameters based on detected artificial light source reflections by the cameras and the acquired heliostat pointing samples; and
control the heliostats to maintain the sun's reflection directed toward the receiver based on the estimated heliostat tracking parameters.

11. The system of claim 1 wherein at least one of the one or more cameras directed toward at least a subset of the heliostats is further configured for producing images of the heliostats in at least one of: daylight and moonlight; and the controller is further configured for estimating parameters of the heliostats for open-loop sun-tracking based on artificial light source reflections from one or more heliostats, said reflection received by the one or more cameras in at least one of: daylight and moonlight.

12. The system of claim 1 wherein the plurality of artificial light sources comprises one or more flashing lights; wherein at least one of the one or more cameras directed toward at least a subset of the heliostats is further configured for synchronized image detection of the one or more flashing lights; and wherein the controller is further configured for estimating parameters of the heliostats for open-loop sun-tracking based on flashing artificial light source reflections from one or more heliostats, received by the one or more cameras.

13. The system of claim 1 wherein the one or more flashing lights comprise at least one low-duty cycle, high intensity, flashing light.

14. A method comprising:
acquiring heliostat pointing samples comprising reflected artificial light via a one or more cameras receiving heliostat reflections of one or more artificial light sources; and
estimating, by a computing device, heliostat tracking parameters based on the pointing samples.

15. The method of claim 14 wherein the one or more artificial light sources comprise one or more curvilinear light sources.

16. The method of claim 14 wherein at least one camera receiving heliostat reflections of artificial light sources is further configured for acquiring heliostat pointing samples in at least one of: daylight and moonlight; and wherein the estimating by the computing device further comprises estimating heliostat tracking parameters of the heliostats for open-loop sun-tracking based on artificial light source reflections from one or more heliostats, received by the at least one camera in at least one of: daylight and moonlight.

17. The method of claim 14 wherein the plurality of artificial light sources comprises one or more flashing lights; wherein at least one camera directed toward at least a subset of the heliostats is further configured for synchronized image detection of the one or more flashing lights; and wherein the estimating by the computing device further comprises estimating parameters of the heliostats for open-loop sun-tracking based on flashing artificial light source reflections, from one or more heliostats, received by the at least one camera.

18. The method of claim 17 wherein the flashing artificial light further comprises flashing, at a low-duty cycle, a high intensity light source.

19. The method of claim 14 further comprising:
directing, via open-loop control, solar reflections toward the receiver based on the estimated tracking parameters.

20. The method of claim 19, wherein the indication of the sun's direction is obtained from a solar positioning algorithm.

21. The method of claim 14, wherein the acquiring comprises:
searching for a configuration of a first heliostat of the heliostats that reflects light from an artificial light source toward a first camera of the cameras; and
storing a sample comprising an identifier of the first heliostat, an identifier of the first camera, an indication of the artificial light source directionality, and the heliostat configuration.

22. The method of claim 21, wherein the searching comprises:
setting the configuration of the first heliostat to a starting configuration based on nominal parameters of the first heliostat, a predetermined location of the first camera, and a location of the artificial light source;
first varying the configuration of the first heliostat about the starting configuration until a reflection is detected by the first camera;
second varying the configuration of the first heliostat within a reflection region in configuration space that maintains detection of the reflection of the first heliostat by the first camera;
and associating a position on the reflection region in configuration space that maintains detection of the reflection with the stored sample.

23. The method of claim 22, wherein the first varying comprises: varying the configuration of the first heliostat in a spiral pattern in configuration space.

24. The method of claim 14, wherein the acquiring further comprises: detecting artificial light reflections at the first camera from multiple heliostats concurrently.

25. The method of claim 14, wherein the estimating comprises: numerically minimizing an error functional based on the pointing samples.

26. The method of claim 14, wherein the acquiring of heliostat pointing samples occurs for a subset of the heliostats while others of the heliostats are tracking the sun.

27. A controller comprising:
a processing unit and addressable member; the processing unit configured to:
receive, by the controller, acquired heliostat pointing samples comprising reflected artificial light via a one or more cameras receiving heliostat reflections of one or more artificial light sources; and
estimate heliostat tracking parameters based on the pointing samples.

28. The controller of claim 27 wherein the processing is further configured to:
search for a configuration of a first heliostat of the heliostats that reflects light from an artificial light source toward a first camera of the cameras; and
store a sample comprising an identifier of the first heliostat, an identifier of the first camera, an indication of the artificial light source directionality, and the heliostat configuration.

29. A processor readable medium having processor executable instructions thereon, which when executed by a processor cause the processor to:
acquire, by a controller, heliostat pointing samples comprising reflected artificial light via a one or more cameras receiving heliostat reflections of one or more artificial light sources;
estimate heliostat tracking parameters based on the pointing samples;
search for a configuration of a first heliostat of the heliostats that reflects light from an artificial light source toward a first camera of the cameras; and
store a sample comprising an identifier of the first heliostat, an identifier of the first camera, an indication of the artificial light source directionality, and the heliostat configuration.

* * * * *